United States Patent [19]

Davis et al.

[11] 3,723,835

[45] Mar. 27, 1973

[54] GLASSES FOR ENCAPSULATING SEMICONDUCTOR DEVICES

[75] Inventors: Earl K. Davis, Tempe; Kent W. Hansen, Scottsdale, both of Ariz.

[73] Assignee: Motorola, Inc., Franklin Park, Ill.

[22] Filed: July 28, 1971

[21] Appl. No.: 166,931

[52] U.S. Cl. .........317/234 R, 317/234 E, 317/234 F, 106/49

[51] Int. Cl. .......H01l 3/00

[58] Field of Search .........317/234; 106/49, 53

[56] References Cited

UNITED STATES PATENTS

| | | | |
|---|---|---|---|
| 3,442,634 | 5/1969 | Katori | 65/42 |
| 3,418,156 | 12/1968 | Medert | 117/124 |
| 3,486,871 | 12/1969 | Martin | 65/33 |
| 3,250,631 | 5/1966 | Lusher | 106/47 |

*Primary Examiner*—John W. Huckert
*Assistant Examiner*—E. Wojciechowicz
*Attorney*—Mueller, Aichele & Gillman

[57] ABSTRACT

Alkali-free glasses for encapsulating semiconductor devices, such as zener diodes, wherein preformed (pressing and sintering) glass packages are formed are disclosed. To prevent degradation of the zener diodes, seals compatible with Dumet lead wire are achieved at temperatures below 550°C. The packages consist of a sleeve glass surrounding glass beads which are sealed to the beads and to the sleeve. Preferably the sleeve glass is slightly harder (higher viscosity at a given temperature) than the bead glass.

9 Claims, 1 Drawing Figure

Patented March 27, 1973 3,723,835
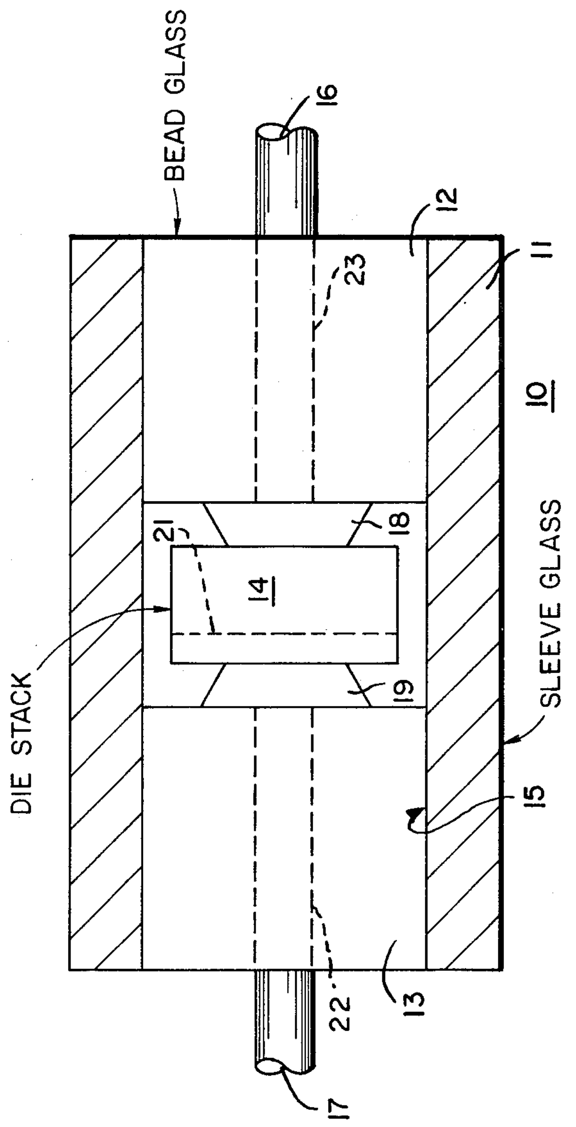
INVENTOR.
Earl K. Davis
BY Kent W. Hansen
Mueller & Aichele
ATTY'S

GLASSES FOR ENCAPSULATING SEMICONDUCTOR DEVICES

BACKGROUND OF THE INVENTION

This invention relates to glass compositions for encapsulating semiconductor devices, more particularly, it relates to such glass compositions which are alkali-free and which produce seals at low temperatures and it is an object of the invention to provide improved glass compositions of this nature.

It is a further object of the invention to provide improved glass compositions of the nature indicated which may be formed into appropriate shapes by preforming techniques.

Forming glass compositions for encapsulating semiconductor devices particularly zener diodes, it has been found advantageous to form the completed device by preforming a glass sleeve, and preforming glass beads which surround the leads which contact the diode surfaces in the final structure. In such an assembly it is essential that the glass be alkali-free and that the appropriate seals between the leads and the glass beads and between the glass beads and the sleeve be formed at such a temperature that the zener diode, or other semiconductor device, is not degraded either by the presence of alkali materials or by the high temperature.

In devices of the character indicated, Dumet leads are used which have a coefficient of expansion very close to that of the glasses which may be used. In this manner stresses between the leads and the glass which might occur with changes in temperature are minimized.

It is a further object of the invention to provide improved glass compositions for encapsulating semiconductor devices which are inexpensive to produce and which result in superior devices.

It is a further object of the invention to provide improved glass compositions for encapsulating semiconductor devices which lend themselves to the formation of preforms by pressing and sintering techniques.

It is a further object of the invention to provide improved glass compositions for encapsulating semiconductor devices which have high electrical resistivities with relatively low softening points and low dissipation factors.

SUMMARY OF THE INVENTION

In carrying out the invention in one form, there is provided, in a glass encapsulated semiconductor device including a semiconductor chip, leads contacting each side of said semiconductor chip, a pair of glass beads, each of said leads being bonded to one each of said leads, a glass sleeve, surrounding said leads and being bonded thereto, a composition of said bead glass comprising, percentages by weight of about $SiO_2$ 9.0 percent, PbO 64.5 percent, $Al_2O_3$ 5.0 percent, ZnO 5.0 percent, CdO 1.0 percent, BaO 1.0 percent, MgO 0.5, CaO 0.5 percent, $TiO_2$ 3.0 percent, $ZrO_2$ 0.5 percent, and $B_2O_3$ 10.0 percent , and a composition of said sleeve glass comprising percentages by weight of about $SiO_2$ 10.0 percent, PbO 64.5 percent, $Al_2O_3$ 6 percent, ZnO 3.0 percent, CdO 1.0 percent, BaO 1.0 percent, MgO 0.5 percent, CaO 0.5 percent, $TiO_2$ 3.0 percent, $ZrO_2$ *0.5 percent and* $B_2O_3$ 10.0 percent.

In carrying out the invention in a second form the sleeve glass is harder than the bead glass effected by the inclusion of about 15 percent by weight of ground $Al_2O_3$ added after the formation of the glass frit.

BRIEF DESCRIPTION OF THE DRAWING

The single FIGURE is a sectional view of a structure incorporating glass compositions according to the invention.

DESCRIPTION OF THE PREFERRED EMBODIMENTS

Referring to the drawing the invention is shown in a glass encapsulated semiconductor device 10 comprising a glass sleeve 11, a pair of glass beads 12 and 13, a die stack 14 disposed between the beads 12 and 13 and within an opening 15, Dumet leads 16 and 17, for example, terminating in terminals 18 and 19 respectively. The semiconductor device 14 may be a zener diode, for example, the PN junction being shown by the dotted line 21, or it may comprise any other form of semiconductor device which it is desired to seal inside of a glass encapsulating package as shown.

It is desirable as has been stated, to make a device which is inexpensive and reliable. To this end the terminals 18 and 19 are brought into contact with the adjacent surfaces of the die stack 14 and are held in this position by the glass beads 12 and 13 which in turn are held to the inside surfaces of the glass sleeve 11, without the use of any springs or other special contacts for attaching means.

The manner of making encapsulated semiconductor devices such as diodes wherein glass beads are sealed to the lead-in conductors and the beads are sealed to a sleeve are known, but such devices have been subject to failure because of the insufficiency of the seals produced between the various components and the nature of the glass used. Also various special artifices have been necessary to make contact between the leads and the semiconductor device.

Alkali-free glasses according to the invention have been developed which are compatible with Dumet (85 expansion) wire, unreactive with zener diodes, and seal below 550°C. A general range of compositions that will work for the leads 12 and 13 and the sleeve 11 is given in Table I.

TABLE I

| Component | Weight % |
|---|---|
| PbO | 60 – 70 |
| $B_2O_3$ | 8 – 12 |
| $SiO_2$ | 8 – 15 |
| $Al_2O_3$ | 1 – 8 |
| ZnO | 1 – 8 |
| $TiO_2$ | 1 – 7 |
| CdO | |
| BaO | |
| MgO | 0 – 2 |
| CaO | |
| $ZrO_2$ | |

Oxides of lead, boron, silicon, aluminum and zinc have been used in proportions indicated in Table I to obtain glasses with suitable softening points and thermal expansion coefficients. It was found that $TiO_2$ and $ZrO_2$ substantially increased the chemical durability, but only limited quantities could be used to avoid devitrification. Both of these oxides in larger quantities than shown result in melts that crystallize when cooled or glasses which devitrify readily.

Small additions of CdO, BaO, MgO, and CaO reduce the tendency to devitrify; and also, the latter two aid chemical durability.

Two glass compositions, in the final preform product, that have been used and have been found to achieve the inventive results are shown in Table II.

TABLE II

| Component | Sleeve Glass Weight in Percent | Bead Glass Weight in Percent |
|---|---|---|
| $SiO_2$ | 10.0 | 9.0 |
| PbO | 64.5 | 64.5 |
| $Al_2O_3$ | 6.0 | 5.0 |
| ZnO | 3.0 | 5.0 |
| CdO | 1.0 | 1.0 |
| BaO | 1.0 | 1.0 |
| MgO | 0.5 | 0.5 |
| CaO | 0.5 | 0.5 |
| $TiO_2$ | 3.0 | 3.0 |
| $ZrO_2$ | 0.5 | 0.5 |
| $B_2O_3$ | 10.0 | 10.0 |

Pertinent physical properties of the glass in Table II are set forth in Table III.

TABLE III

| Property | Sleeve Glass | Bead Glass |
|---|---|---|
| Thermal expansion coefficient (ave. 25–300°C) | $74\times10^{-7}$/°C | $78\times10^{-7}$/°C |
| Density (gm/cc) | 5.29 | 5.38 |
| Softening Point ($10^{7.6}$ poises) | 509°C | 486°C |
| Annealing Point ($10^{13.0}$poises) | 430°C | 412°C |
| Strain Point ($10^{14.5}$poises) | 412°C | 389°C |
| Approximate Seal Temperature | 560°C | 540°C |

The glasses in Table II are not detrimental to zener diodes or other semiconductor devices when the glasses are at the sealing temperature in the vicinity of or in contact with the diodes. This is attributed to the lack of alkali and other mobile monovalent ions such as $Cu^{1+}$. It has been found that glasses with very mobile cations degrade the devices. Also, as will be discussed later, the electrical resistivity of these glasses is very high, thus reducing leakage currents.

In forming the device shown in the single FIGURE, whether by using the compositions shown in Table I for both the beads and the sleeve, the compositions of Table II for the beads and the sleeve, or other formulations disclosed herein, the process of making the device is essentially the same. To obtain, in the final glass preforms, the percentage weight of ingredients as shown in Table I or Table II, bulk, or batch, ingredients were first melted in a platinum crucible at about 1,100°C. for about 1 hour while stirring with a platinum propellor to homogenize the melt. The bulk ingredients are lead silicate (85% PbO), PbO (yellow form), $Pb_3O_4$, $Al_2$ $(OH)_3$, zinc oxide, cadmium oxide, barium carbonate, cadmium carbonate, magnesium carbonate, titanium dioxide, zirconium dioxide and boric acid, ($H_3BO_3$).

By way of example, in Table IV, the weights of the batch ingredients are for the bead glass of Table II.

TABLE IV

| Component | Weight in percent, final product | Batch Weight in grams 800 grams total | |
|---|---|---|---|
| $SiO_2$ | 9.0 | Lead (85%)-silicate | 480.0 |
| PbO | 64.5 | PbO (yellow) | 68.0 |
| | | $Pb_3O_4$ | |
| $Al_2O_3$ | 5.0 | ZnO | 40.0 |
| CdO | 1.0 | CdO | 8.0 |
| BaO | 1.0 | $BaCO_3$ | 10.3 |
| MgO | 0.5 | $MgCO_3$ | 9.5 |
| CaO | 0.5 | $CaO_3$ | 7.1 |
| $TiO_2$ | 3.0 | $TiO_2$ | 24.0 |
| $ZrO_2$ | 0.5 | $ZrO_2$ | 4.0 |
| $B_2O_3$ | 10.0 | $H_3BO_3$ | 142.1 |

After the melt has been made, a glass frit is formed by pouring the melt into deionized water. Thereafter the glass frit is ground to a desired fineness. If no additional ground $Al_2O_3$ is to be added for strength to the sleeve glass frit, as in one form of the invention, the glass beads 12 and 13 with holes 22 and 23 therethrough and the glass sleeve 11 are formed by mixing the ground frit with any appropriate well known binder followed by placing the frit with binder added into appropriately shaped molds and pressing the material into the desired shape. Thereafter the glass beads 12 and 13 and the sleeve 11 are placed in furnaces and presintered at a temperature of about 505°C. The sintering temperature causes a small amount of flow to take place to give a certain dimensional stability to the parts, but no devitrification takes place. The beads and the sleeve in this step have shrunk to somewhere near their final dimensions.

The leads including the nailhead terminals 18 and 19 are then assembled to the glass beads by inserting the leads through the holes 23 and 22, respectively. This subassembly is then passed through a furnace wherein the temperature is such that the glass of the beads flows to the leads 16 and 17 and forms an initial bond therewith. Sufficient flow takes place at this stage for the bonding.

While the leads 16 and 17 may be the Dumet wire alone, the Dumet wire may be coated, for example, with sodium borate, Dumet oxide (copper oxide) or gold-plated.

After the beads have been partially sealed to the leads 16 and 17, the final assembly is made by placing the die stack 14 inside of the sleeve 11, by placing subassemblies of the leads 16 and 17 and the glass beads 13 and 12, respectively, in the sleeve 11 also with the terminals 18 and 19 contacting the two respective sides of the semiconductor 14. The assembly is then placed in a furnace in an inert atmosphere such as nitrogen including at some stage changing the atmosphere to a vacuum. Final sealing of the beads 12 and 13 to the leads 17 and 16 and to the sleeve 11 takes place by heating the combination in a furnace to a temperature in the range 525°C for about 8 minutes. At this stage sufficient flow takes place for sealing the beads to the leads and for sealing the beads to the sleeve. Pressure may be applied to the beads 12 and 13 and thus to the terminals 18 and 19 during the final sealing process in order to maintain pressure of the contacts 18 and 19 against the surfaces of the semiconductor member of chip 14. The pressure is maintained during the cooling step following the sealing step. If the devices as described are heated to temperatures any substantial amount higher than those indicated, and in any event no higher than 550°C, the semiconductor device 14 may be substantially degraded in its performance.

While glass seals can be made of glasses of the composition shown in Tables I and II using the same glass for the beads 12 and 13 and sleeve 11, definite advantages are obtained, in the preferred form, by using a softer glass for the beads than for the sleeve when the glass parts have been formed by pressing and sintering. With a slightly harder glass in the sleeve 11, it is easier to maintain dimensional stability of the device while obtaining a seal. The seal is accomplished by the bead glass flowing against the lead wire and the outer sleeve. The sleeve glass should soften enough, however, at the seal temperature, to hermetically seal micropores and cracks. This means the softening point of the harder sleeve glass should be below the sealing temperature of the softer glass.

Another advantage of minimizing the flow of the sleeve glass is that the reaction of the glass with graphite molds in which the final heating step takes place is reduced. High lead glasses, which these are, tend to stick to graphite if there is excessive flow. This is a mechanical linkage rather than a chemical bond. When the glass sticks, microcracks, commonly called Griffith flaws, are introduced into the glass part when it is pulled from the mold. These flaws substantially weaken the final device.

It should be noted that the "flow point" of a glass can be changed by changing the composition of the glass and/or by adding a grog material such as alumina ($Al_2O_3$). Even though $Al_2O_3$ is added to the sleeve glass for strength, a harder glass is preferred for the sleeve than for the beads to minimize sticking between the device and the molds.

Improved strengths in the sleeve glass were obtained, according to the invention, when about 15 percent of alumina, $Al_2O_3$, (Linde A-14) was added to the powdered glass. This increased strength was determined by pulling the leads of the devices using an Instron testing unit.

The results of these tests are shown in Table V. In all cases, fracture occurred in the glass cylinder wall rather than by pulling the leads out of the beads or some other mechanism. Also, borated or oxidized leads gave superior results to bare leads.

TABLE V

| | Pull Strength |
|---|---|
| Device with glass as shown in Table II (ave. of 8 devices) | 4.7 Kg=120 Kg/cm² |
| Device with 15% $Al_2O_3$ mixed with sleeve glass (ave. of 10 devices) | 6.3 Kg=162 Kg/cm² |

The significant point of this is not that $Al_2O_3$ increases strength of glass, this having been demonstrated many times with some glasses, but that the particular glasses whose compositions are set out in Tables I and II are compatible with $Al_2O_3$ (alumina) and were strengthened. Not all glasses can be strengthened by adding $Al_2O_3$. To use alumina, it is preferred that the glass have an expansion coefficient near alumina and that the alumina not devitrify the glass nor be readily dissolved at the glass softening point. These requirements have been met with these glasses.

In the devices where a harder glass is used for the sleeve as just described by the addition of about 15 percent alumina, the initial sintering after the pressing operation has taken place, takes place at a temperature in the range of about 510° to 515°C. In this case as well as in the earlier case the seal of the leads to the beads is formed by heating in the range of 505° to 525°C.

The 15 percent approximately of grog or ground $Al_2O_3$ is added to the glass frit after it has been formed with the proportions indicated hereinbefore in this specification. That is to say the grog or strengthening glass does not take the place of the $Al_2O_3$ which is an ingredient of the glass in the first instance.

The glass parts made with the hardened sleeve glass also can be made by the preforming process. In either case the glasses are sufficiently stable, i.e., free of devitrification that preforms can be made and the parts subsequently fired at sealing temperature while remaining essentially vitreous. This is not true of all glasses; an Owens-Illinois glass, SG-67, with the proper thermal expansion coefficient devitrified uncontrollably, making it impractical to obtain a satisfactory seal.

Not only must the encapsulating glasses have physical and chemical properties as outlined in previous sections, but they must also be good electrical insulators to minimize leakage current. Some DC resistivities of the bead and sleeve glasses are tabulated in Table VI. As can be seen, the resistivity is greater than $10^{15}$ ohm cm at temperatures below 100°C. This is an extremely high value for glasses with softening points and thermal expansion coefficients as low as these. And, the dissipation factor (tan δ) is very low. It is important to note that the dissipation factor is very nearly equal to the power factor (sin δ) at values below 0.1. The dielectric properties are summarized in Table VII. The electrical properties represented in Tables VI and VII were measured on discs which had been poured from the melt and polished.

TABLE VI

Volume DC resistivity of the sleeve and bead glasses as measured in dry $N_2$ atmospheres

| | Temperature (°C) | | | |
|---|---|---|---|---|
| | 25 | 100 | 200 | 300 |
| log ρ (ohm cm) sleeve | < 15 | < 15 | 11.9 | 9.6 |
| log ρ (ohm cm) bead | < 15 | < 15 | 11.5 | 9.2 |

TABLE VII

Dielectric properties of sleeve and bead glasses measured in dry $N_2$ atmospheres.

| Temperature (°C) | 25 | 100 | 200 |
|---|---|---|---|
| Sleeve Glass | | | |
| Dielectric constant | | | |
| 10²Hz | 20.4 | 20.7 | 21.1 |
| 10⁵Hz | 20.3 | 20.6 | 20.9 |
| | | Temperature | |

| | 25 | 100 | 200 |
|---|---|---|---|
| Sleeve Glass | | | |
| Dissipation Factor | | | |
| $10^2$Hz | 0.0008 | 0.0010 | 0.0056 |
| $10^5$Hz | 0.0007 | 0.0008 | 0.0010 |
| Bead Glass | | | |
| Dielectric constant | | | |
| $10^2$Hz | 19.6 | 19.8 | 20.3 |
| $10^5$Hz | 19.5 | 19.7 | 20.0 |
| Dissipation Factor | | | |
| $10^2$Hz | 0.0009 | 0.0045 | 0.007 |
| $10^5$Hz | 0.0009 | 0.0009 | 0.00115 |

Below in Table VIII are examples of glass compositions according to the invention containing a higher percentage of $TiO_2$ content than the ones shown in Table II. The increase in the $TiO_2$ content was advantageous because of the improved chemical durability needed to accommodate a gold-plating operation after sealing.

TABLE VIII

| Component | glass weight in percent | glass weight in percent | glass weight in percent |
|---|---|---|---|
| $SiO_2$ | 9.0 | 9.0 | 9.0 |
| PbO | 66.5 | 64.5 | 66.5 |
| $Al_2O_3$ | 6.5 | 3.0 | 6.5 |
| ZnO | 2.0 | 1.0 | 3.5 |
| CdO | 0 | 3.0 | 0 |
| BaO | 0 | 1.0 | 0 |
| MgO | 0 | .5 | 0 |
| CaO | 0 | .5 | 0 |
| TiO | 6.0 | 7.0 | 4.5 |
| $ZrO_2$ | 0 | .5 | 0 |
| $B_2O_3$ | 10.0 | 10.0 | 10.0 |
| | 100.0 | 100.0 | 100.0 |

By way of example, in Table IX, the weights of the batch ingredients for the glass components set forth in the third column of Table VIII are shown.

TABLE IX

| Component | Weight in percent, final product | Batch Weight in grams 800 grams total | |
|---|---|---|---|
| $SiO_2$ | 9.0 | Lead (85%)-silicate | 480 |
| PbO | 66.5 | PbO (yellow) | 85 |
| | | $Pb_3O_4$ | 40.9 |
| $Al_2O_3$ | 6.5 | $Al(OH)_3$ | 79.6 |
| ZnO | 3.5 | ZnO | 28.0 |
| $TiO_2$ | 4.5 | $TiO_2$ | 36.0 |
| $B_2O_3$ | 10.0 | $H_3BO_3$ | 142.1 |

From the batch ingredient weights set out in Tables IV and IX, it will be clear to those skilled in the art how to compute batch weights for other glass samples.

The basic glass, as for example, the bead glass of Table II and the glasses of Table VIII have been used for both the beads and the sleeve. The sleeve glass has been made harder than the bead glass by the addition of about 15 percent of alumina as already explained.

What is claimed is:

1. In a glass encapsulated semiconductor device including a semiconductor chip, leads contacting each side of said semiconductor chip, a pair of alkali free glass beads preformed by sintering from pressed ground frit, one each of said beads being bonded to one each of said leads, and an alkali free glass sleeve preformed by sintering from pressed ground frit, said glass sleeve surrounding said glass beads and being bonded thereto, the composition of said bead glass and said sleeve glass producing bonding at temperatures of about 550°C and comprising, in the end product, as to said bead glass, a frit having percentages by weight of the ingredients in the range of about $SiO_2$ 8–15 percent, PbO 60–70 percent, $B_2O_3$ 8–12 percent, $Al_2O_3$ 1–8 percent, ZnO 1–8 percent, $TiO_2$ 1–7 percent, and the combination CdO, BaO, MgO, CaO and ZrO totalling 0–2 percent , and as to said sleeve glass, the combination of a frit and a strengthening material, said latter frit having percentages by weight of the ingredients in the range of about $SiO_2$ 8–15 percent, PbO 60–70 percent, $B_2O_3$ 8–12 percent, $Al_2O_3$ 1–8 percent, $TiO_2$ 1–7 percent, and the combination CdO, BaO, MgO, CaO, and ZrO totalling 0–2 percent, and said strengthening material comprising $Al_2O_3$ in the amount of about 15 percent of said latter frit.

2. The composition according to claim 1 wherein the frit of said bead glass comprises percentages by weight of about $SiO_2$ 9.0 percent, PbO 64.5 percent, $Al_2O_3$ 5.0 percent, ZnO 5.0 percent, CdO 1.0 percent, BaO 1.0 percent, MgO 0.5 percent, CaO 0.5 percent, $TiO_2$ 3.0 percent, ZrO 0.5 percent, and $B_2O_3$ 10.0 percent, and the frit of said sleeve glass comprises percentages by weight of about $SiO_2$ 10.0 percent, PbO 64.5 percent, $Al_2O_3$ 6 percent, ZnO 3.0 percent, CdO 1.0 percent, BaO 1.0 percent, MgO 0.5 percent, CaO 0.5 percent, $TiO_2$ 3.0 percent, $ZrO_2$ 0.5 percent and $B_2O_3$ 10.0 percent.

3. The composition according to claim 1 wherein the frits of said bead glass and said sleeve glass comprise percentages by weight of about $SiO_2$ 9.0 percent, PbO 66.5 percent, $Al_2O_3$ 6.5 percent, ZnO 2.0 percent, $TiO_2$ 6.0 percent, $B_2O_3$10.0 percent, CdO, BaO, MgO, CaO and ZrO each zero percent.

4. The composition according to claim 1 wherein the frits of said bead glass and said sleeve glass comprise percentages by weight of about $SiO_2$ 9.0 percent, PbO 64.5 percent, $Al_2O_3$ 3.0 percent, ZnO 1.0 percent, CdO 3.0 percent, BaO 1.0 percent, MgO 0.5 percent, CaO 0.5 percent, $TiO_2$ 7.0 percent, ZrO 0.5 percent and $B_2O_3$ 10.0 percent.

5. The composition according to claim 1 wherein the frits of said bead glass and said sleeve glass comprise percentages by weight of about $SiO_2$ 9.0, PbO 66.5 percent, $Al_2O_3$ 6.5, ZnO 3.5, $TiO_2$ 4.5 percent, $B_2O_3$ 10.0 percent, CdO, BaO, MgO, CaO, and $ZrO_2$ each zero percent.

6. The composition according to claim 1 wherein said device comprises a zener diode.

7. The encapsulating composition for a semiconductor device according to claim 2 wherein said device comprises a zener diode.

8. A glass encapsulated zener diode comprising a zener diode chip, leads contacting each side of said chip under stresses developed between said chip and said encapsulation under temperature coefficient of expansion differential, a pair of glass beads, one each of said beads being bonded to one each of said leads, and a glass sleeve surrounding said glass beads and being bonded thereto at a temperature no greater than about 550° C., said glass sleeve being alkali free and being formed by pressing a mixture of ground frit and about 15 percent of $Al_2O_3$ and sintering, whereby the glass of said glass sleeve is harder than the glass of said beads.

9. A glass encapsulated zener diode according to claim 8 wherein the leads contacting said diode are of Dumet wire.

* * * * *